United States Patent
Neter et al.

(10) Patent No.: US 8,202,081 B2
(45) Date of Patent: Jun. 19, 2012

(54) MOULD CAVITY WITH DECOUPLED COOLING-CHANNEL ROUTING

(75) Inventors: Witold Neter, Newnan, GA (US);
Helmut Thoemmes, Kastel (DE);
Marek Hoenisch, Huenstetten (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 223 days.

(21) Appl. No.: 12/308,285

(22) PCT Filed: Jun. 14, 2007

(86) PCT No.: PCT/EP2007/055920
§ 371 (c)(1),
(2), (4) Date: Aug. 11, 2010

(87) PCT Pub. No.: WO2007/144413
PCT Pub. Date: Dec. 21, 2007

(65) Prior Publication Data
US 2010/0297287 A1    Nov. 25, 2010

(30) Foreign Application Priority Data
Jun. 16, 2006   (DE) .......................... 10 2006 028 149

(51) Int. Cl.
*B29C 45/73*      (2006.01)
(52) U.S. Cl. .......................... 425/547; 425/548; 425/552
(58) Field of Classification Search .................. 425/547, 425/548, 552
See application file for complete search history.

(56) References Cited

U.S. PATENT DOCUMENTS

| | | | |
|---|---|---|---|
| 3,191,225 A | 6/1965 | Polka | |
| 3,887,350 A | 6/1975 | Jenkins | |
| 5,096,410 A * | 3/1992 | Loulourgas | 425/547 |
| 6,176,700 B1 | 1/2001 | Gellert | |
| 7,361,009 B2 * | 4/2008 | Li | 425/547 |

FOREIGN PATENT DOCUMENTS

| | | |
|---|---|---|
| DE | 2037365 A | 1/1972 |
| DE | 3301337 A1 | 7/1984 |
| DE | 4234961 A1 | 4/1994 |
| DE | 19903699 | 8/2000 |
| DE | 10209174 A1 | 9/2003 |
| DE | 10236523 A1 | 2/2004 |
| DE | 202005008170 U1 | 7/2005 |
| EP | 0117010 | 8/1984 |
| WO | WO2005/051632 A1 | 6/2005 |
| WO | WO2007/045074 A1 | 4/2007 |

* cited by examiner

*Primary Examiner* — Tim Heitbrink
(74) *Attorney, Agent, or Firm* — Michael L. Dunn

(57) ABSTRACT

A cavity member for a mold cavity structure for the production of hollow body moldings, wherein the cavity member has a substantially hollow-cylindrical element, wherein a cooling passage is provided at the outside of the hollow-cylindrical element. To provide a cavity member which is simple to manufacture and which permits more effective cooling of the cavity member it is proposed in accordance with the invention that there are provided one or more guide elements for forming the cooling passage, wherein the guide elements and the hollow-cylindrical element are in the form of separate parts.

25 Claims, 20 Drawing Sheets

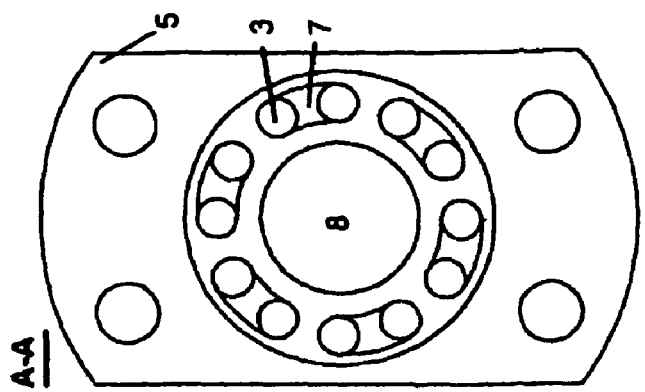
Figur 3
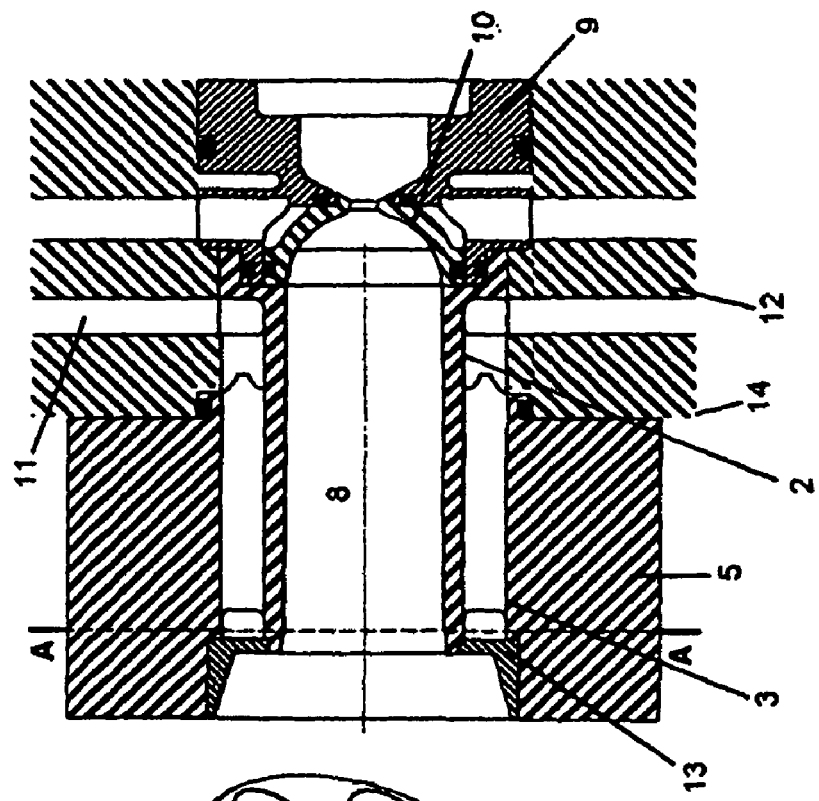
Figur 2
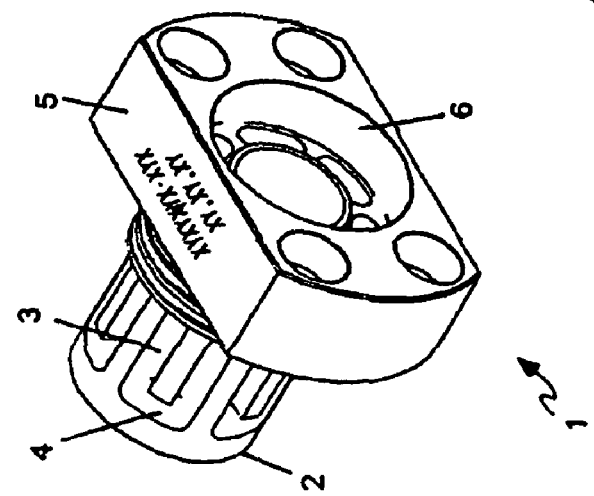
Figur 1

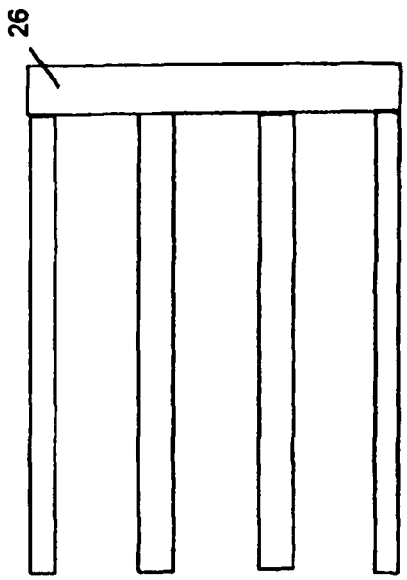
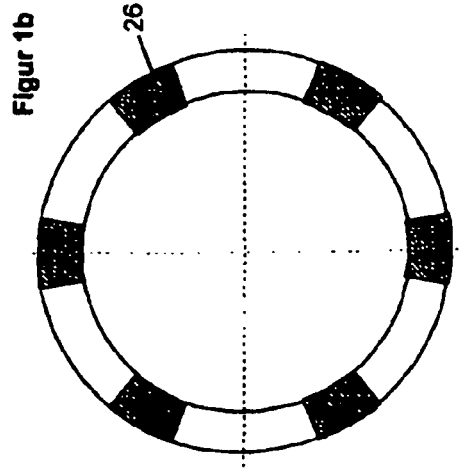
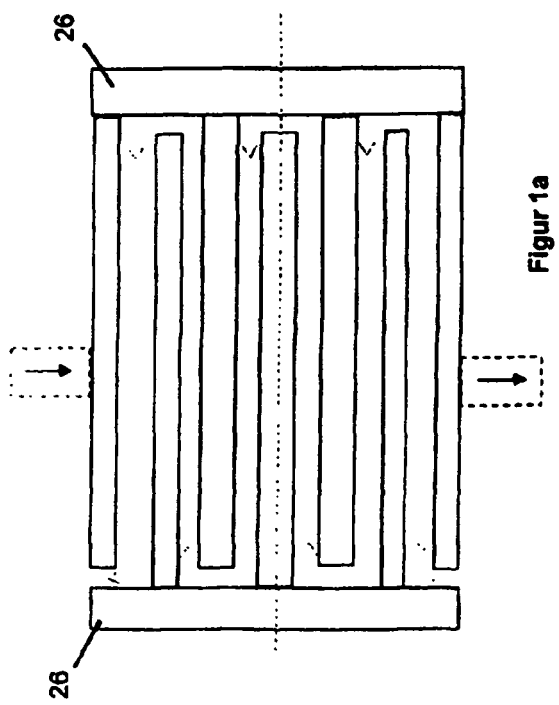
Figur 1a
Figur 1b
Figur 1c

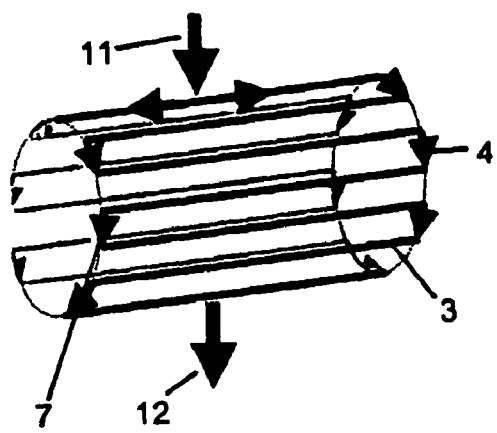
Figur 5
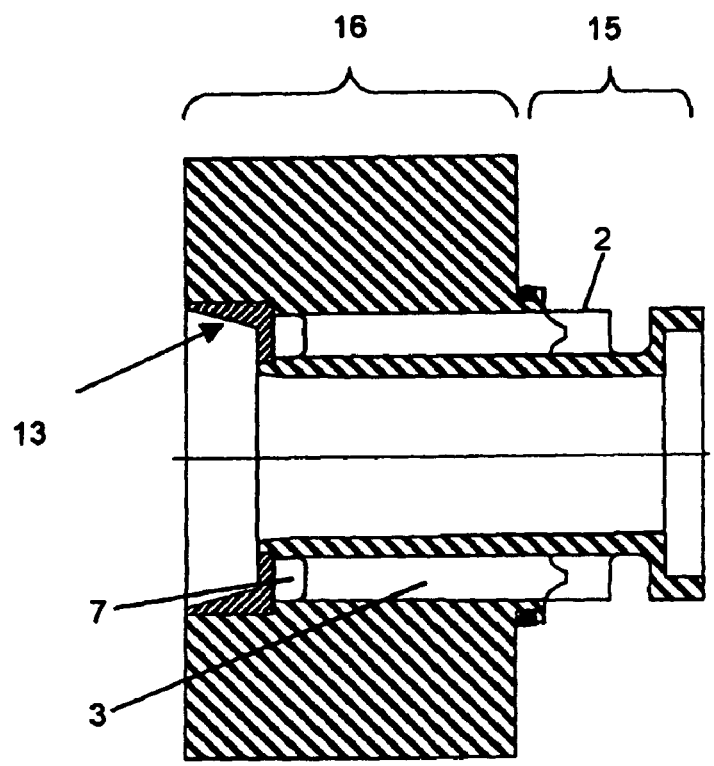
Figur 4

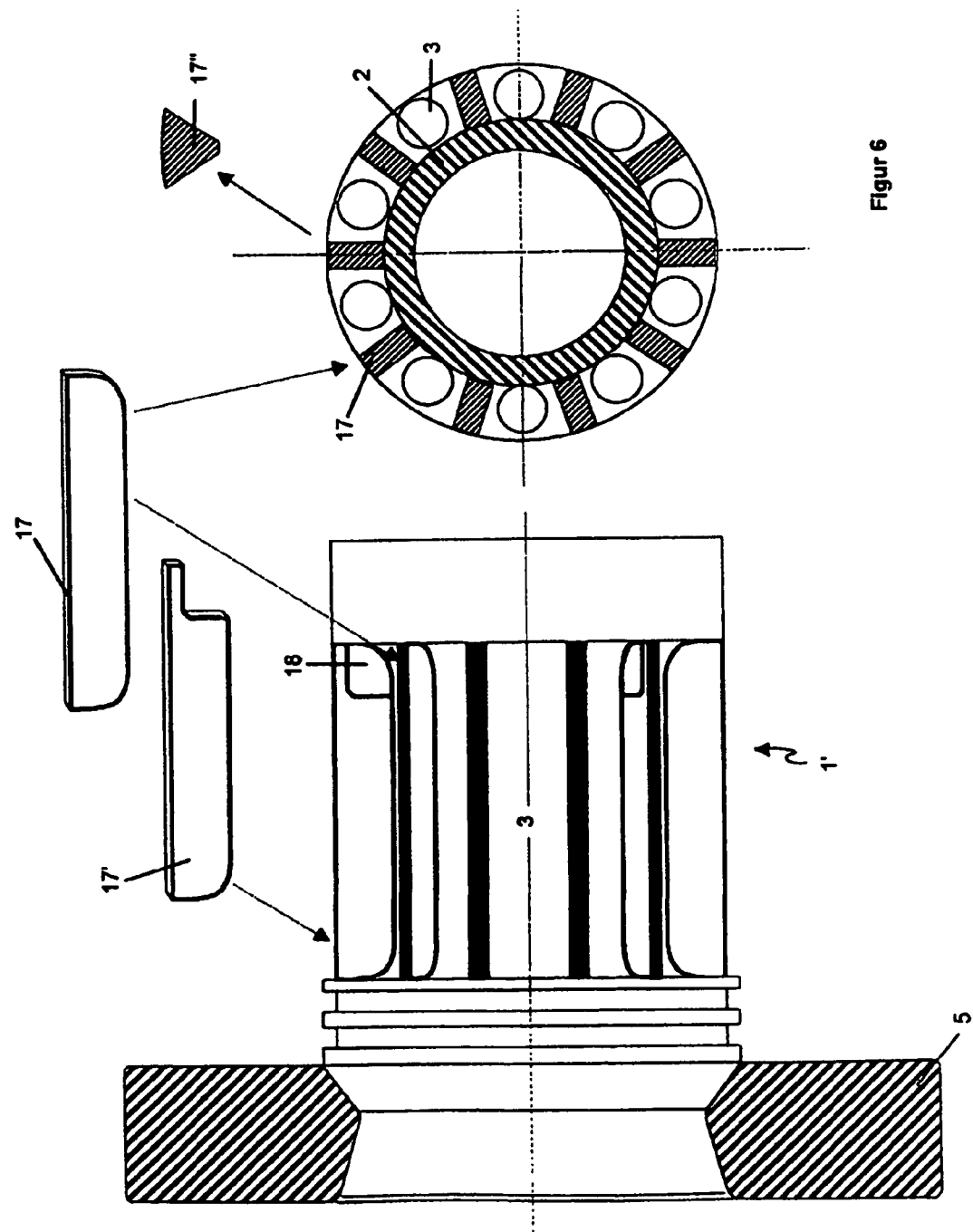
Figur 6

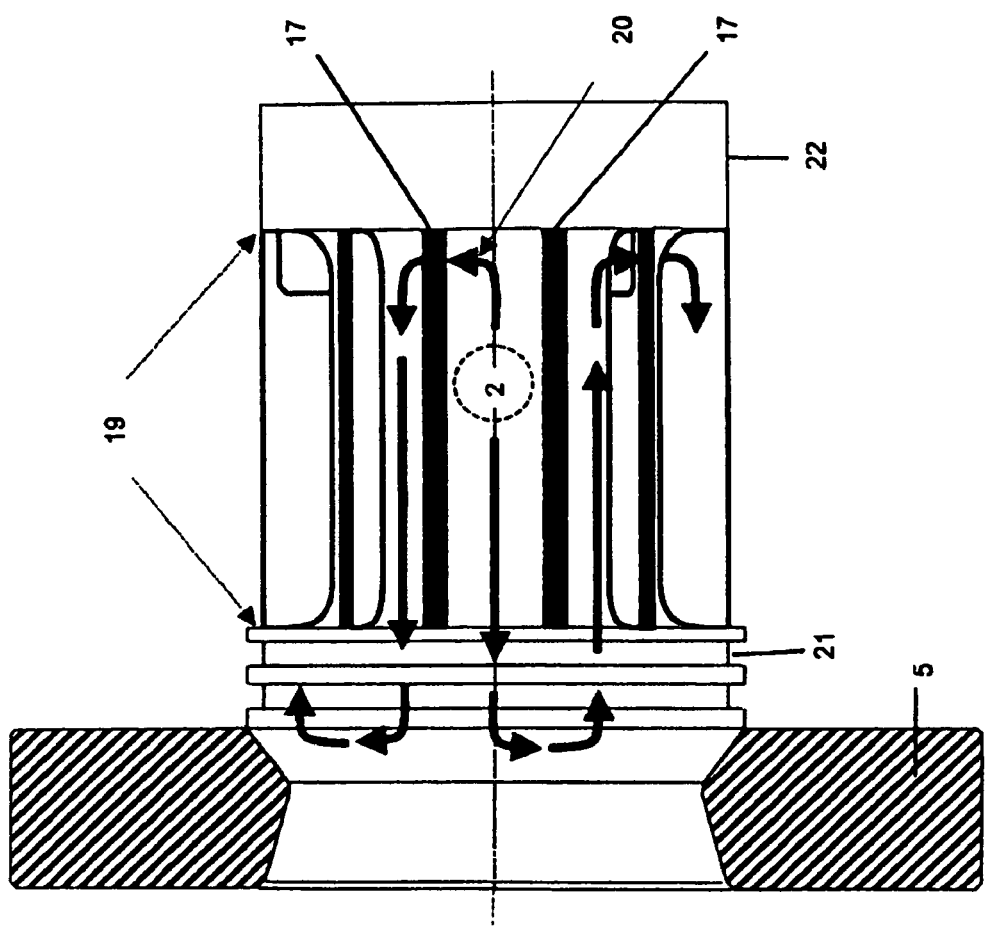

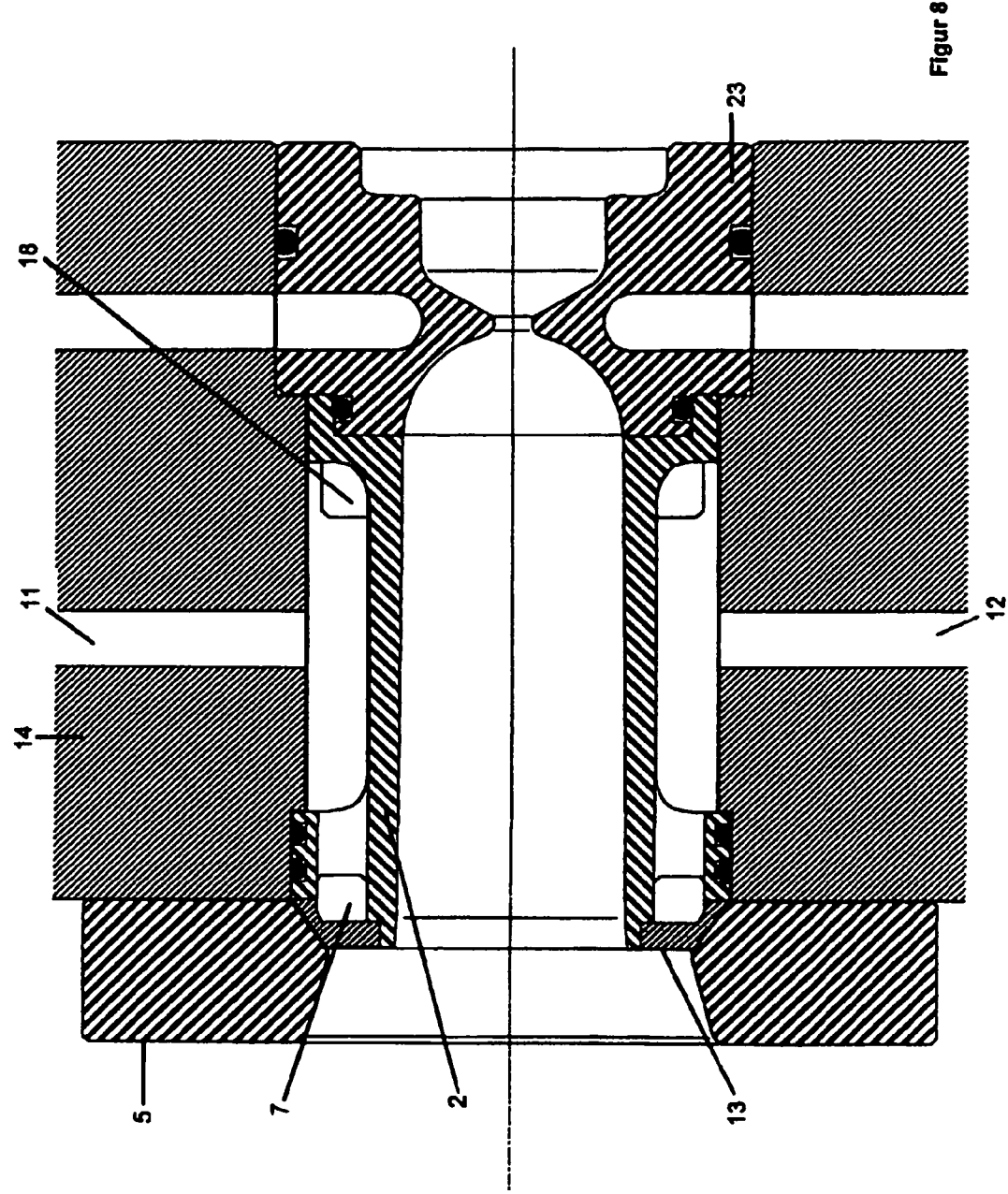

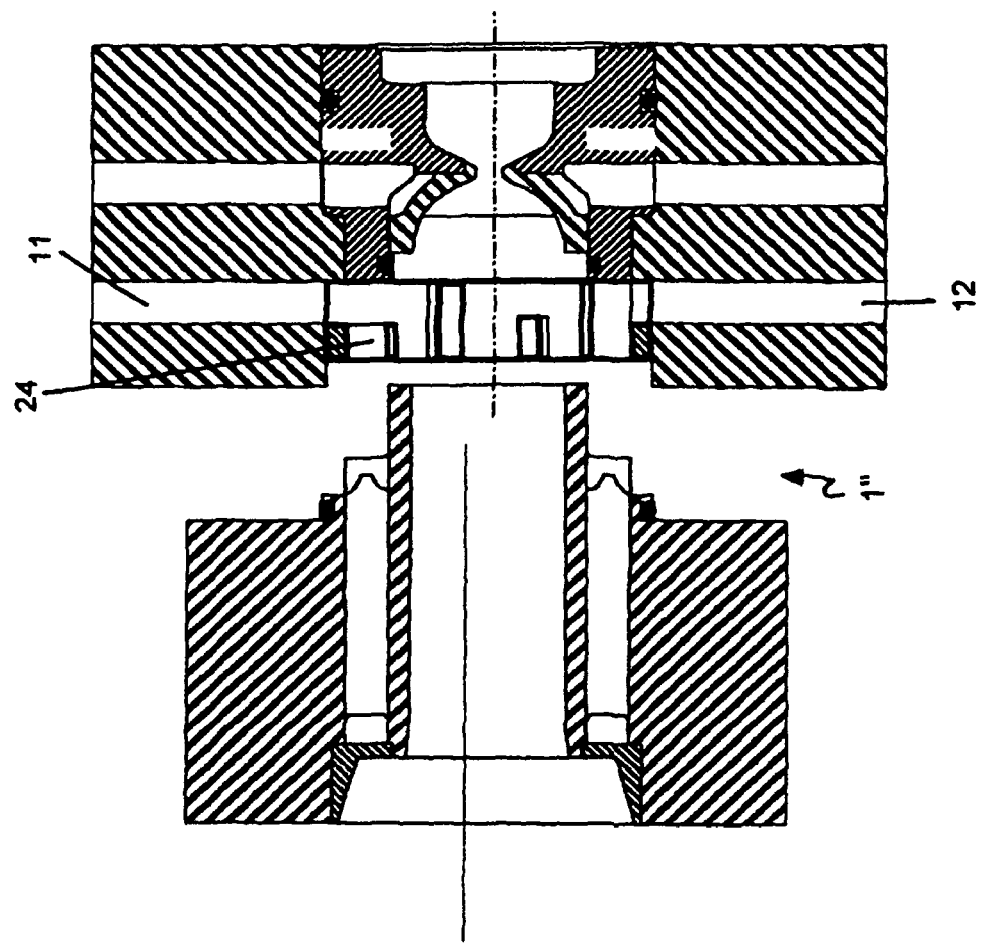
Figur 9
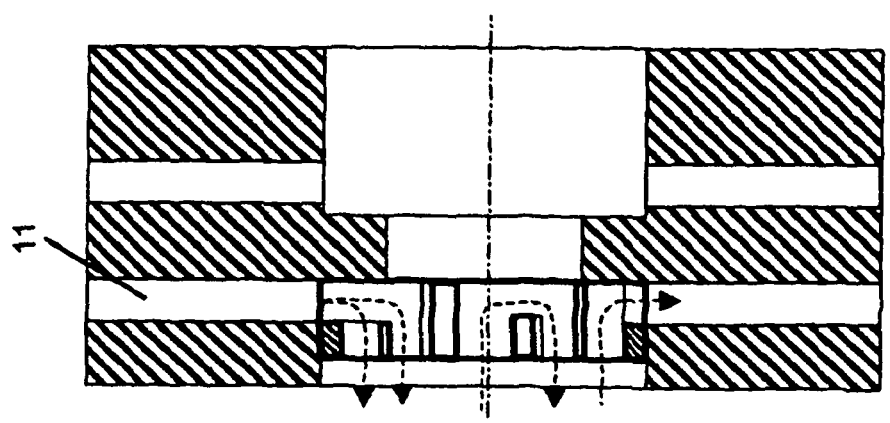
Figur 10

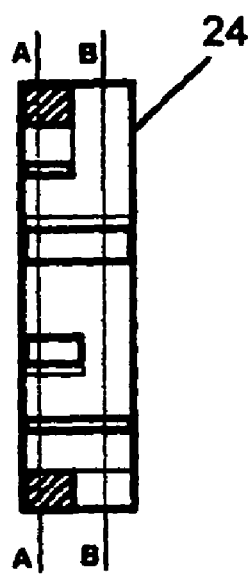
Figur 11
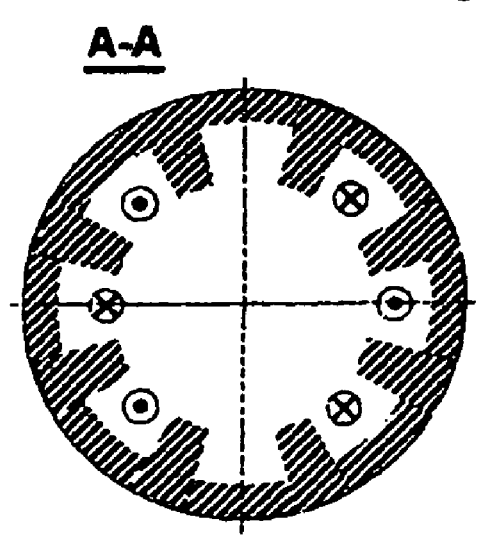
Figur 12
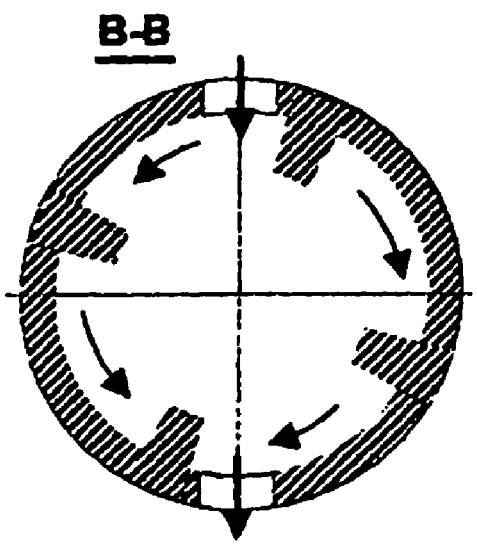
Figur 13

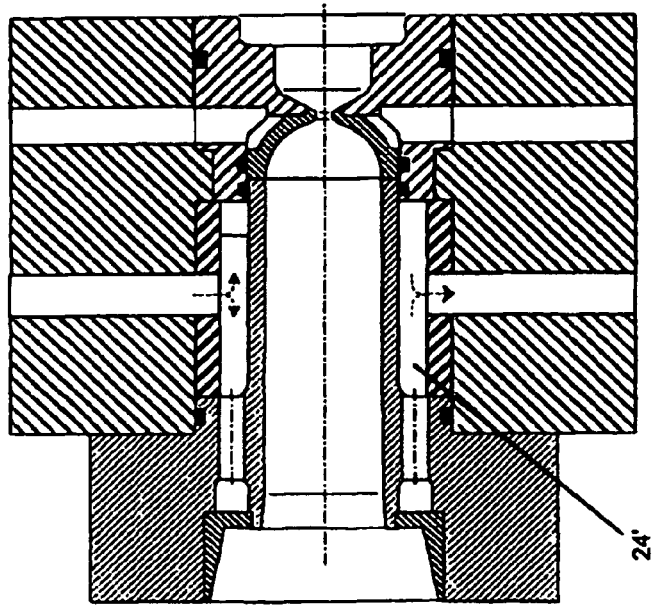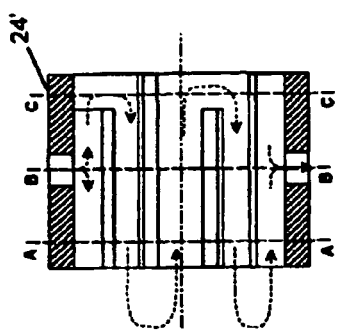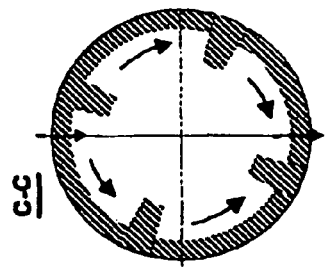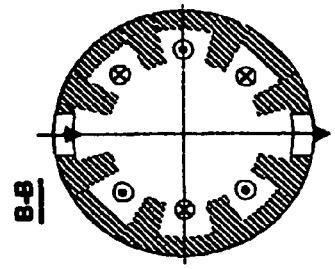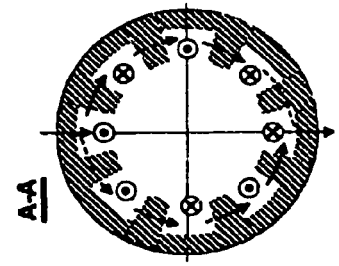

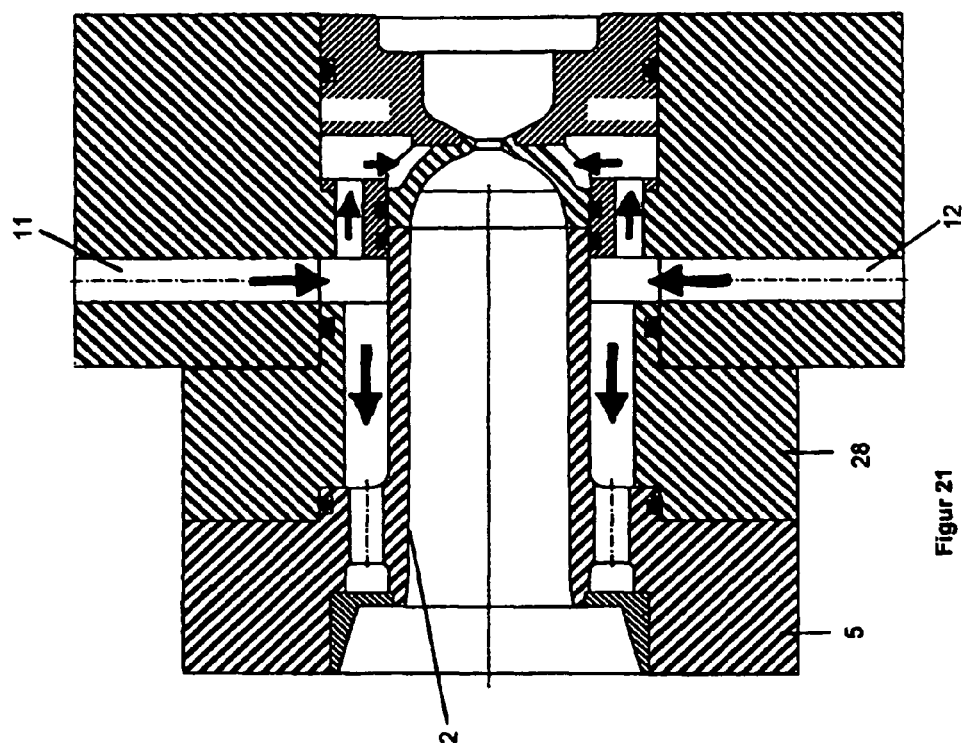
Figur 21
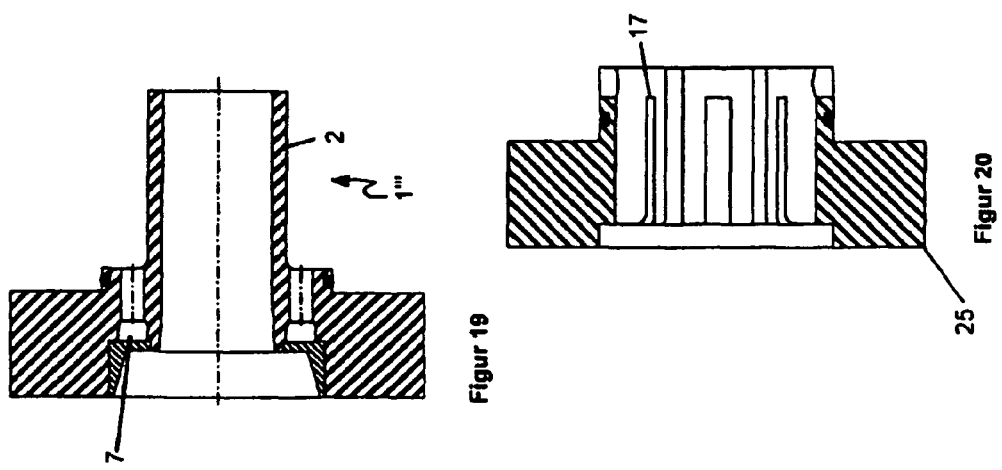
Figur 19  Figur 20

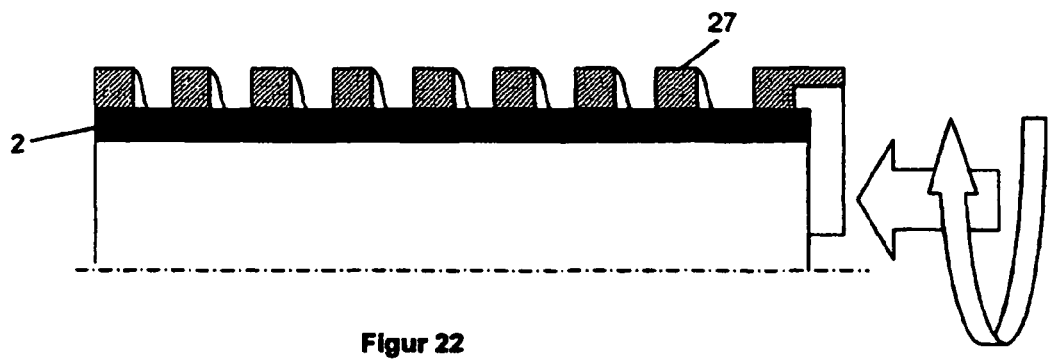
Figur 22

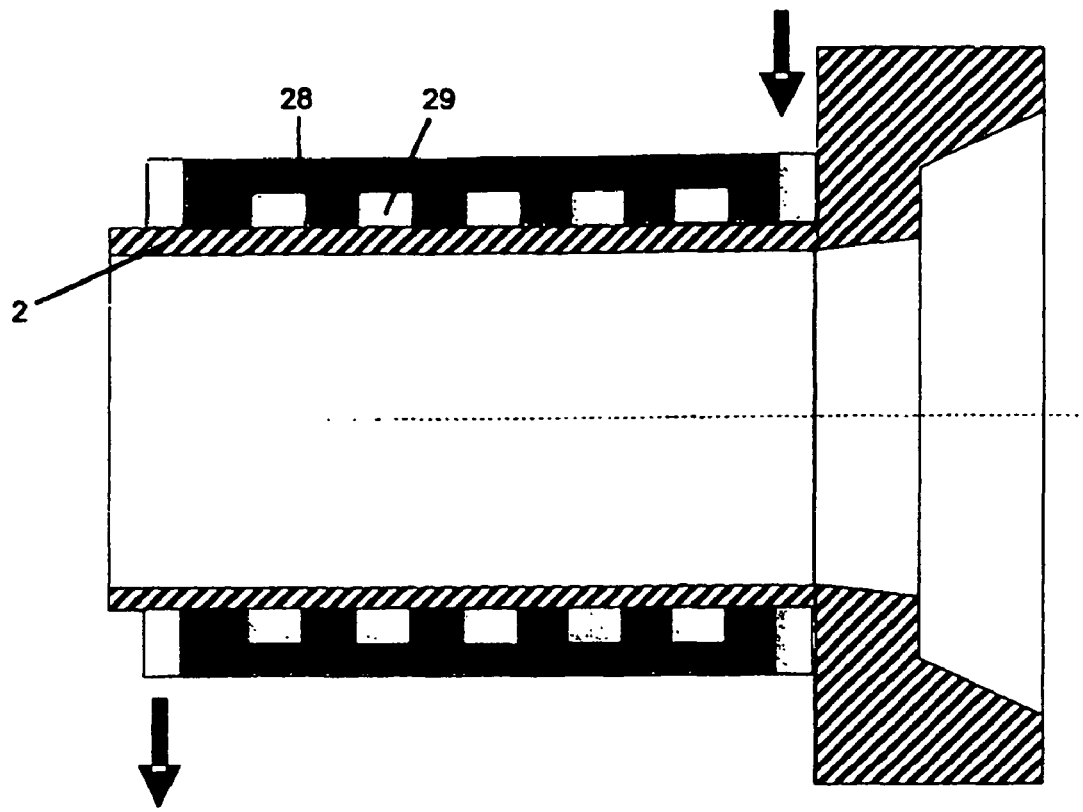
Figur 23

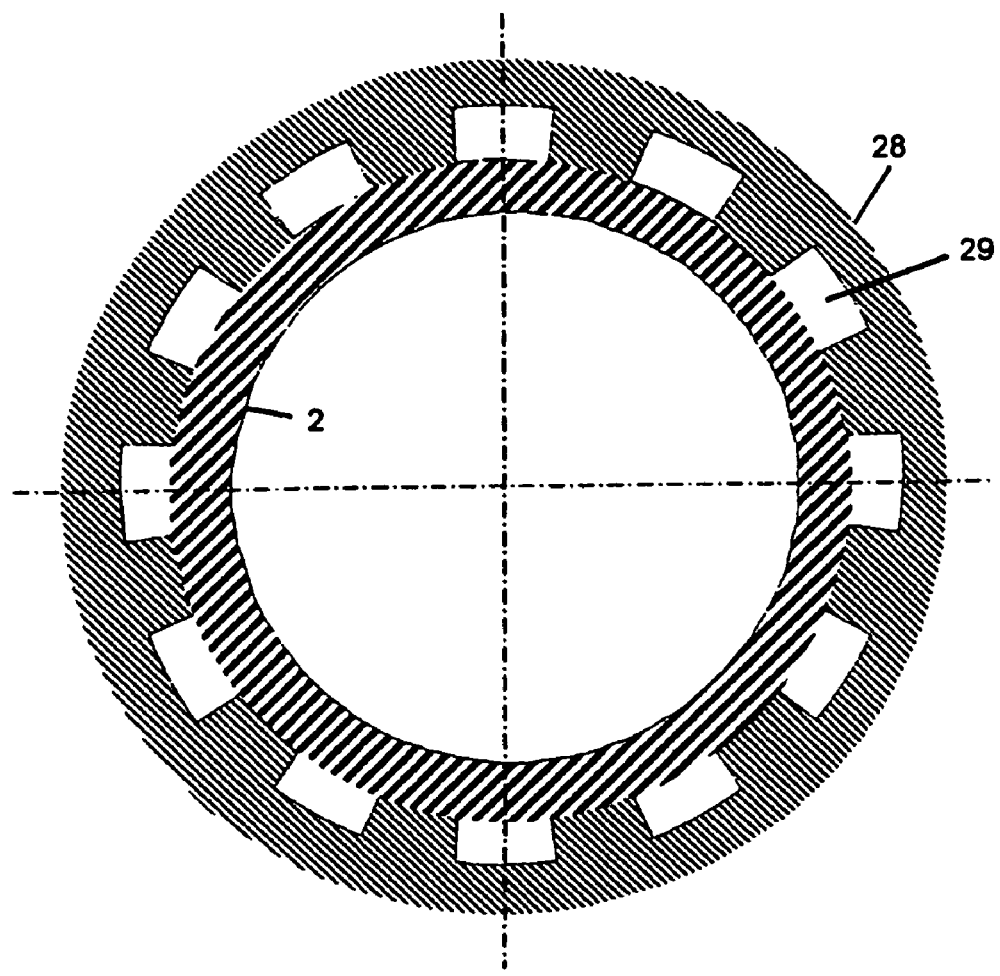
Figur 24

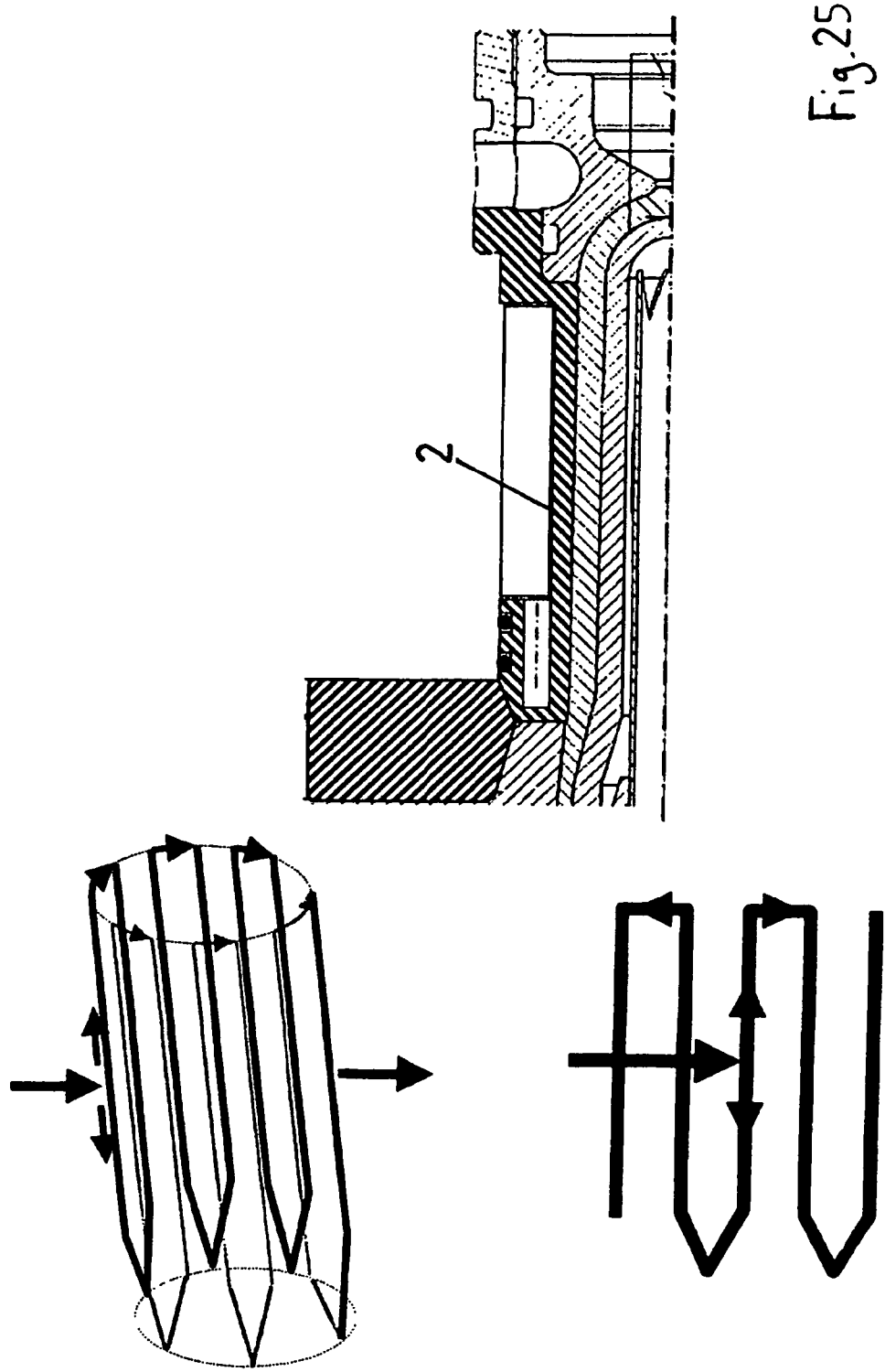

MOULD CAVITY WITH DECOUPLED COOLING-CHANNEL ROUTING

BACKGROUND OF THE INVENTION

The present invention concerns a cavity member for a mold cavity structure for the production of hollow body moldings by means of injection molding.

In plastic material processing injection molding represents the most important process for the production of moldings. In the injection molding procedure the molding material in powder form or in granulate form is plasticised for example in a screw injection molding machine and then urged into the closed, generally cooled tool, for example a mold cavity structure. When the mold or the mold space provided therein is completely filled with the melt, it hardens by cooling. That generally involves a reduction in volume. That is frequently compensated by melt being further subsequently urged into the mold, from the injection cylinder. In addition the contraction is also generally taken into consideration by a suitable oversize in the mold contour. Finally the tool or the mold cavity structure is opened and the finished molding (injection molding) is removed and ejected. The tool can be closed again and a fresh working cycle can begin, with renewed injection.

By means of injection molding it is possible to produce hollow bodies which can be inflated in a later working step for example to afford bottles or canisters. Those hollow bodies are also referred to as preforms or parisons.

Mold cavity structures for the production of parisons which are intended for subsequent inflation to form PET bottles usually comprise a core, a cavity member, a base insert and a neck jaw.

In the closed condition of the mold cavity structure a mold space, the shape of which corresponds to the molding to be produced, is formed between the core on the one hand and the base insert, cavity and neck jaw on the other hand. The outside contour of the core thus forms the inside contour of the hollow body molding while the outside contour of the hollow body molding is formed by the cavity member, the base insert and the neck jaw.

The cavity member has a substantially hollow-cylindrical element. The base of the mold space is formed by the base insert which adjoins the cavity member. The neck jaw adjoins the cavity member at the side remote from the base insert.

In other words, the neck jaw, the cavity member and the base insert afford a hollow space into which the core penetrates.

In general all parts of the mold cavity structure are cooled. Therefore the cavity member has a cooling passage at the outside of the hollow-cylindrical part. Usually the cooling passage comprises a groove of spiral shape, which is introduced into the outside of the hollow-cylindrical element of the cavity member. In operation the cavity member is fitted with the remaining parts of the mold cavity structure into what is referred to as a cavity plate. The cavity plate has a corresponding recess. The cooling passage is then formed on the one hand by the spiral groove and on the other hand by the inside wall of the corresponding recess in the cavity plate, which closes the spiral groove. In most cases the cavity plate is designed to receive a multiplicity of mold cavity structures, for example 192.

Such a mold cavity structure is known for example from WO 2005/051632.

Introducing the known spiral groove into the material of the cavity member however leads to a considerable reduction in the strength or stiffness of the hollow-cylindrical element by virtue of the notch effect. In principle any deviation from a continuous cross-section leads to a notch stress which alters the strength characteristics of the component in an adverse fashion. For that reason the hollow-cylindrical element must be relatively thick-walled to prevent the cavity member breaking in operation. In addition, in the state of the art, the grooves must be provided with a rounded groove bottom in order not to excessively influence the strength characteristics. In principle however it is desirable for the cooling fluid to be passed as closely as possible to the mold space in which the molding to be produced and therefore to be quickly cooled is disposed. A thick wall and/or a rounded groove bottom are therefore rather disadvantageous.

The known spiral grooves are also relatively complicated and expensive to produce. It has also been found that, by virtue of the spiral configuration of the cooling passage, a substantial part of the cooling fluid flowing through the cooling passage does not come into contact with the cavity member by virtue of centrifugal force, and therefore also does not contribute to the cooling action. In addition the heat to be dissipated occurs substantially at the groove bottom so that a temperature gradient is formed within the cooling fluid so that the temperature of the cooling fluid decreases from the outside inwardly or from the groove bottom to the inside wall of the cavity plate recess. Accordingly because of their greater density the colder cooling fluid constituents preferably flow in the outside region of the spiral cooling passage so that it is precisely the cooling fluid flow which is particularly preferred for effective cooling that contributes only little to the cooling action.

BRIEF SUMMARY OF THE INVENTION

The object of the present invention is to provide a cavity member which is simple to produce and which permits more effective cooling of the cavity member.

According to the invention that object is attained in that there are provided one or more guide elements for forming the cooling passage, wherein the guide elements and the hollow-cylindrical element are in the form of separate parts.

More specifically the invention is cavity member for a mold cavity structure for the production of hollow body moldings, wherein the cavity member (1) has a substantially hollow-cylindrical element (2) having an outside and ends, wherein a cooling passage (4) is provided at the outside of the hollow-cylindrical element (2). One or more guide elements are provided for forming the cooling passage wherein the guide elements and the hollow-cylindrical element are in the form of separate parts.

The hollow-cylindrical element (2) usually has ring elements (21, 22) at its outside and substantially at its ends, which ring elements project beyond the outside of the hollow-cylindrical element (2), wherein the guide elements (17) are fixed to the ring elements (21, 22).

The guide elements (17) are preferably substantially bar-shaped, wherein the guide elements (17) are oriented in an axial direction relative to the hollow-cylindrical elements (17).

At least some of the guide elements (17) have a through opening (18) forming the cooling passage portions (4) arranged substantially in a peripheral direction in the region of an end portion of the guide element (17). The peripheral direction is a direction the follows a curve of the peripheral surface of the cylinder.

BRIEF DESCRIPTION OF THE SEVERAL VIEWS OF THE DRAWINGS

FIG. 1 shows a perspective view of a first embodiment of a cavity member,

FIGS. 1a-1c show a plurality of detail views of the guide element of the first embodiment, FIG. 2 shows a sectional view of the FIG. 1 embodiment in the condition of being fitted into the tool, FIG. 3 shows a sectional view along line A-A in FIG. 2, FIG. 4 shows a sectional view of the cavity member of FIG. 1, FIG. 5 shows a diagrammatic view of the fluid flow configuration in the cavity member, FIG. 6 shows a side view and a view from below of a second embodiment of the invention, FIG. 7 shows the side view of FIG. 6 with diagrammatically illustrated fluid flow configuration, FIG. 8 shows a sectional view of the second embodiment of FIGS. 6 and 7 in the condition of being fitted into the tool, FIG. 9 shows a third embodiment of the cavity member according to the invention, FIG. 10 shows a portion from FIG. 9 with the diagrammatically illustrated fluid flow configuration, FIG. 11 shows a side view on to a deflection element, FIG. 12 shows a sectional view along line A-A in FIG. 11, FIG. 13 shows a sectional view along line B-B in FIG. 11, FIG. 14 shows a sectional view of the third embodiment in the condition of being fitted into the tool, wherein the deflection element has been modified, FIG. 15 shows a plan view of the modified deflection element with illustrated fluid flow configuration, FIG. 16 shows a sectional view along line A-A in FIG. 15, FIG. 17 shows a sectional view along line B-B in FIG. 15, FIG. 18 shows a sectional view along line C-C in FIG. 15, FIG. 19 shows a sectional view of a fourth embodiment of a cavity member according to the invention, FIG. 20 shows a sectional view of a cavity member enlargement, FIG. 21 shows a sectional view of the fourth embodiment of FIGS. 19 and 20 in the condition of being fitted into the tool, FIG. 22 shows a diagrammatic sectional view of part of a fifth embodiment, FIG. 23 shows a longitudinal section through a sixth embodiment, FIG. 24 shows a cross-section through the sixth embodiment of FIG. 23, FIG. 25 shows a sectional view of a fifth embodiment and diagrammatic views of the flow configuration.

DETAILED DESCRIPTION OF THE INVENTION

Figure 26:
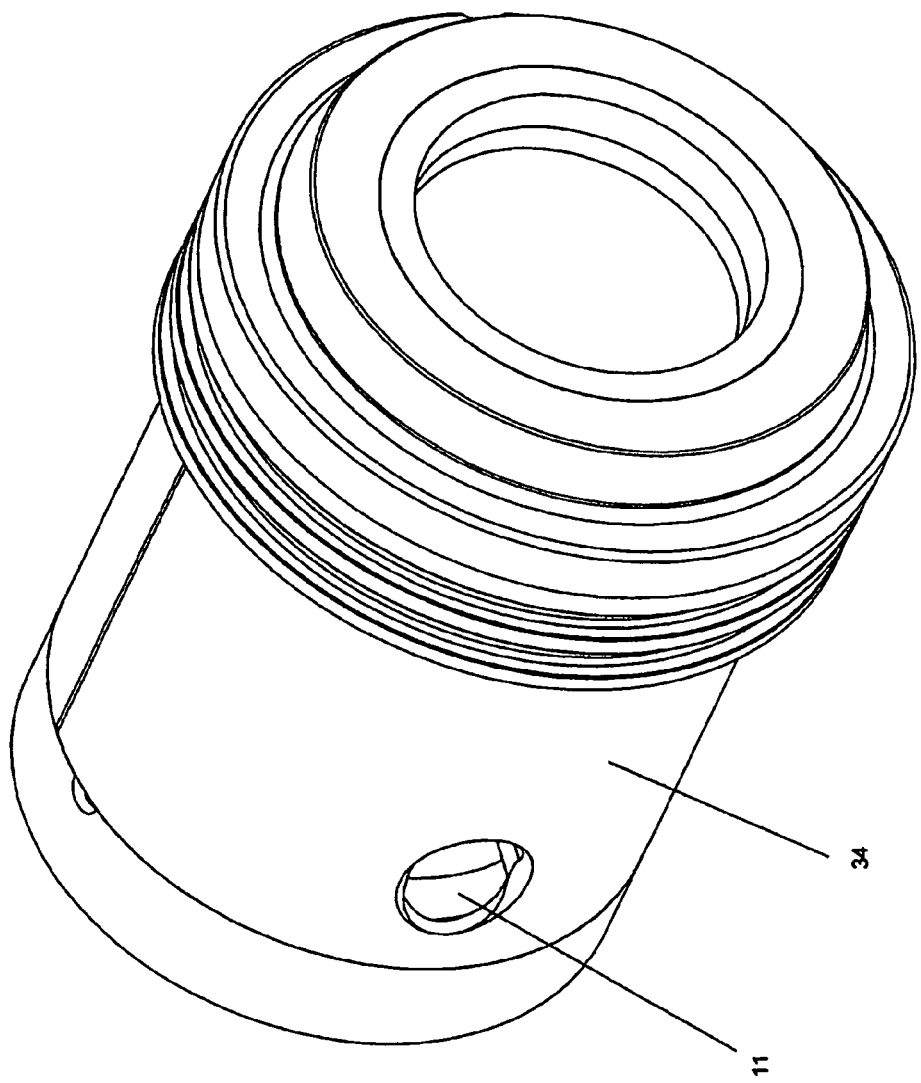
FIG. 26 shows a perspective view of a seventh embodiment.
Figure 27:
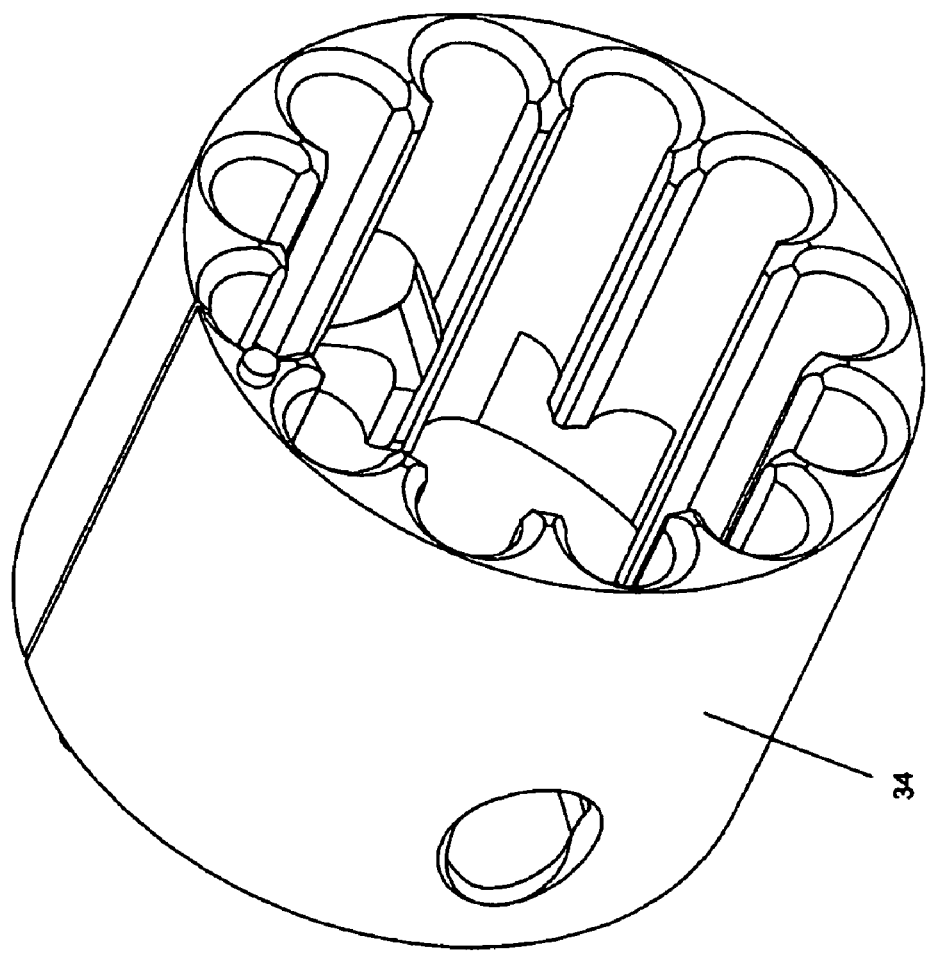
FIG. 27 shows a perspective view of the peripheral casing element of the embodiment of FIG. 26.
Figure 28:
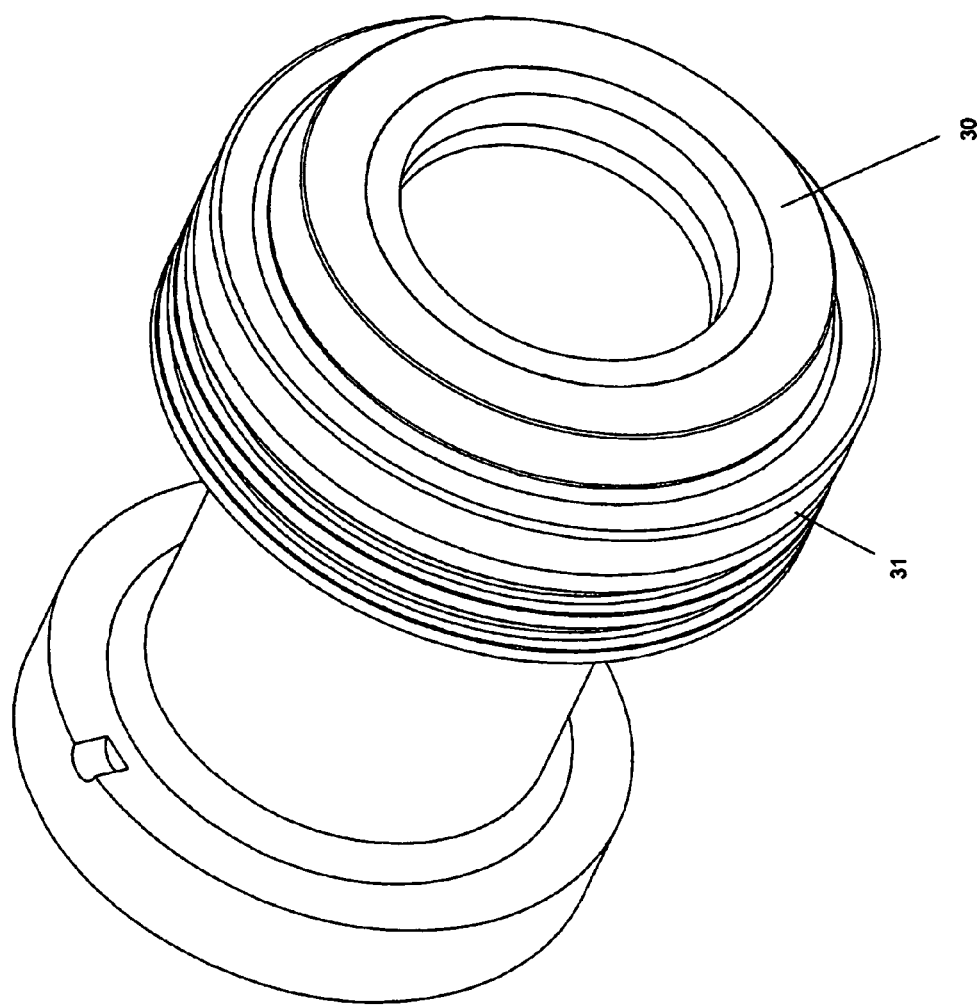
FIG. 28 shows a perspective view of the base element of the embodiment of FIG. 26.

It has been found that a hollow cylinder has a very high level of strength. That high strength decreases considerably if the outside of the hollow cylinder is worked or machined in any form. Thus surprisingly a hollow cylinder with grooves milled into the outside is of markedly lower strength in comparison with a hollow cylinder without millings therein, more specifically even if the hollow cylinder with grooves milled therein, at the groove bottom, still involves a wall thickness which is comparable to the wall thickness of the hollow cylinder without millings therein. In other words, with the same strength the hollow cylinder without millings therein can be produced with a smaller wall thickness than the wall thickness of the groove bottom of a hollow cylinder with grooves milled therein. As however the cooling action is correspondingly greater and thus correspondingly more direct, the smaller the wall thickness, the provision of a hollow cylinder without recesses or milled-out openings at its outside surface is of great advantage.

As however the cooling fluid must be guided in some form over the outside surface of the hollow-cylindrical element, in accordance with the invention there are provided guide elements which are in the form of a separate element.

In principle it is possible for the guide element to be welded, soldered or in some other fashion fixed on the outside of the hollow-cylindrical element. It has been found however that, when fixing the guide element on the outside of the hollow-cylindrical element, stresses can be transmitted to the cavity member, which again reduce the strength.

In a preferred embodiment it is provided that a respective ring element which projects beyond the outside of the hollow-cylindrical element adjoins the hollow-cylindrical element at its outside, substantially at its ends, wherein the guide elements are fixed to the ring elements and preferably not to the hollow-cylindrical element.

That kind of fixing ensures that virtually no stresses are transmitted to the cavity member by way of the guide element. In spite of a careful design configuration however that embodiment can have the result that the guide elements do not afford a fluid-tight connection to the outside surface of the hollow-cylindrical element. It has been recognised however that that connection does not have to be of fluid-tight nature.

In a particularly preferred embodiment the guide elements are substantially bar-shaped, and are particularly preferably oriented in the axial direction. The axial orientation of the guide elements provides that a respective substantially axially extending cooling passage portion is provided on both sides of the guide elements.

In a particularly preferred embodiment the cooling passage portions arranged in the peripheral direction are formed by through openings provided in the guide elements, wherein preferably the through openings are provided substantially in the region of an end portion of the guide element. The cooling fluid then flows along the substantially axially arranged cooling passages between two adjacent guide elements, then passes through the through opening in the guide element into the adjacent axially extending cooling passage portion and there flows in opposite relationship along the axial cooling passage portion. The through opening provided alternately in the end portions of the guide elements can thus provide a cooling passage which is of a meander configuration or a zig-zag configuration.

In a preferred embodiment the guide elements are of a substantially rectangular cross-sectional area. That means that the guide elements can be quite inexpensively produced. For many situations of use however it may be advantageous for the guide elements to be of a substantially triangular cross-sectional area.

As the cavity member including the guide elements are fitted in operation into a corresponding sleeve or a cavity plate with corresponding recess, a further preferred embodiment provides that the guide elements are of a shape that is rounded at their side remote from the hollow-cylindrical element. That curved surface preferably follows substantially the peripheral surface of a cylinder.

In a further particularly preferred embodiment the cooling passage has a plurality of cooling passage portions extending substantially in the axial direction and at least one connecting portion, wherein the connecting portion connects two cooling passage portions extending substantially in the axial direction.

In particular the cooling passage portions which extend in the axial direction provide for highly efficient cooling as no centrifugal forces here provide for a separation of colder and hotter cooling fluid. In addition the main loading of the mold cavity structure occurs in the axial direction so that grooves extending in the axial direction limit the strength characteristic, by virtue of the notch effect, much less than grooves extending in the peripheral direction. It is therefore possible and even advantageous by virtue of the improved wetting effect for the cooling passages arranged in the axial direction, to be formed with a flat base or even with an inwardly curved base.

The connecting portion preferably extends substantially in the peripheral direction.

It will be appreciated that the improved cooling effect is correspondingly greater, the greater the proportion of cooling passage portions extending in themselves substantially in the axial direction, in relation to the total cooling passage length. Preferably, the totaled length of all substantially axially extending cooling passages is at least twice as great and preferably at least five times as great and particularly preferably at least ten times as great as the totaled length of all connecting portions.

Therefore it is provided in a preferred embodiment that there are at least four, preferably at least eight and particularly preferably at least twelve cooling passage portions extending substantially in the axial direction. They are then connected by cooling passage portions extending substantially in the peripheral direction.

The cooling passage is thus of a substantially meanderform configuration.

There are embodiments in which the cavity member has a collar portion with a through opening, wherein the hollow-cylindrical element is in part arranged in the through opening so that the through opening is filled in part by the hollow-cylindrical element. The part of the through opening, that is not filled by the hollow-cylindrical element, then serves to receive an external cone of the neck jaw.

In a particularly preferred embodiment the arrangement according to the invention of the cooling passage portions allows that at least some of the cooling passage portions extending in the axial direction at least partially extend into the collar portion. In contrast to the state of the art therefore the collar portion itself can be cooled directly with cooling fluid. In the case of the known cavity members, cooling of the collar portion was effected only by heat conduction within the cavity member, which led to a markedly reduced cooling efficiency.

In a further particularly preferred embodiment at least some of the cooling passage portions extending substantially in the peripheral direction are arranged at an end of the hollow-cylindrical element, wherein preferably there is provided a closure element which at the end closes the cooling passage portions which are arranged at the end of the hollow-cylindrical element and which extend substantially in the peripheral direction.

Thus it is possible for example for the cooling passage portions extending substantially in the axial direction to be in the form of axial bores which extend for example into the collar portion. Then, at the end of the hollow-cylindrical element, recesses are produced in the hollow-cylindrical element, the recesses respectively connecting each two adjacent substantially axially extending cooling passages. The end of the hollow-cylindrical element is then covered with the closure element. The closure element can be for example soldered to the hollow-cylindrical element.

The recesses which respectively connect two adjacent substantially axially extending cooling passage portions here form the connecting portions arranged substantially in the peripheral direction.

Basically the closure element can be of any desired form and can also be of a multi-part configuration. In a particularly preferred embodiment the closure element is of a substantially annular configuration and in a particularly preferred embodiment has an internal cone at the side remote from the cooling passage portions. That is advantageous in particular when using a cavity member with a collar portion as the collar portion can be more easily produced thereby. In principle the through opening in the collar portion, that is not filled by the hollow-cylindrical element, must have a portion with an internal cone so that it can co-operate with a corresponding external cone portion of the neck jaw. The conical configuration of the closure element can provide that the through opening can be formed in the collar portion in the form of a through bore, the internal cone then being formed by the closure element.

In accordance with a further alternative embodiment it is provided that the guide elements involved are in the form of two comb elements with teeth, being so arranged that the teeth of the two comb elements respectively engage into the inter-tooth spaces of the other comb element.

That toothed structure provides a zigzag-shaped cooling passage in a simple fashion.

The comb elements respectively comprise for example a ring element and at least one and preferably a plurality of tooth elements extending from the ring element in the direction of the ring axis. Those comb elements can be pushed on to the outside of the hollow-cylindrical element.

As an alternative thereto the guide element can be in the form of a spiral element. The spiral element can be for example a sleeve with a spiral recess, which is pushed over the outside of the hollow-cylindrical element.

Such a spiral element also has the advantage that it has a certain flexibility so that the spiral element can be produced with a greater tolerance and thus at lower cost as it can compensate for certain tolerances by virtue of its flexibility.

In addition it is very easy to fit. Firstly the spiral element can be rotated at its ends in the peripheral direction relative to each other so that the diameter of the spiral element increases. In that condition the spiral element can be easily pushed on to the hollow-cylindrical element. When then the ends of the spiral element are released it will bear against the outside wall of the hollow-cylindrical element by virtue of the elastic biasing effect. Additional screwing or soldering is generally not necessary.

In a further alternative embodiment the guide element is in the form of a sleeve, in the inside wall of which a spiral groove is provided.

The present invention also concerns a mold cavity structure having the described cavity member as well as a tool having such a mold cavity structure.

In that respect, in the tool in a particularly preferred embodiment, a cooling fluid feed and a cooling fluid discharge are arranged in such a way that two parallel cooling circuits are formed by the cooling passage structure of the cavity member. In other words, the cooling fluid flow fed from one side to the cavity member is divided and flows in two separate fluid flows around the cavity member in each case over a peripheral angle of about 180°. Then, arranged on the side of the cavity member, that is approximately opposite to the cooling fluid feed, is the cooling fluid discharge where the two cooling fluid flows come together again.

In a further particularly preferred embodiment arranged in a recess in the cavity plate of the tool is a cooling fluid distributor which connects together at least two substantially axially extending cooling passage portions of the hollow-cylindrical element by way of a connecting passage arranged within the cooling fluid distributor so that the connecting passage forms a cooling passage portion arranged substantially in the peripheral direction.

Further advantages, features and possible uses will be apparent from the description hereinafter of preferred embodiments and the accompanying drawings.

FIG. 1 shows a perspective view of a first embodiment of the cavity member 1 according to the invention. The cavity member 1 has a hollow-cylindrical portion 2 and a collar element 5. As can be seen in particular from the sectional view in FIG. 2 the collar element 5 has a through opening into which the hollow-cylindrical element 2 partially penetrates. A cooling passage 3, 4 can be seen in the hollow-cylindrical element at the outside thereof. The cooling passage 3, 4 comprises cooling passage portions 3 extending substantially in the axial direction and connecting portions 4 extending substantially in the peripheral direction. On the side remote from the hollow-cylindrical element 2 the collar element 5 has a recess 6 which serves to receive a neck jaw.

The cooling passage is formed here by two comb elements 26. Such a comb element can be more clearly seen in FIGS. 1b and 1c. The comb element comprises a portion in ring form and a plurality of teeth (six in the illustrated example) which extend in the axial direction from the ring portion. Two such comb elements 26 are arranged as shown in FIG. 1a. The teeth of a comb element 26 respectively engage into the inter-tooth spaces of the other comb element 26 so that the teeth form a indented, substantially meander-shaped structure. In FIG. 1a the intended fluid flow is diagrammatically illustrated by arrows.

FIG. 2 shows a sectional view of the embodiment of the cavity member illustrated in FIG. 1, in the condition of being fitted into the tool.

The tool here includes a cavity plate 14 which generally has an entire row of recesses, for example 48 or 96, into each of which a respective cavity member 1 is fitted.

In the tool adjoining the hollow-cylindrical portion 2 is the base insert 9, which here is of a two-part configuration. Because the cooling passage in the outside wall of the hollow-cylindrical element is fitted into the cavity plate 14, the cooling passage is formed on the one hand by the milled cooling grooves and on the other hand by the inside wall of the recesses in the cavity plate 14.

The cavity plate 14 has a fluid feed 11 and a cooling fluid discharge 12. It can be clearly seen that the axially oriented cooling passage portions 3 extend into the collar portion 5. It is provided that the cooling fluid flows around the cavity member 1 in a meander form or in a zig-zag configuration. Recesses 7 are provided in the material in order to interconnect axially extending cooling passage portions 3 which are adjacent to each other at the end of the cavity member 1.

For closing the cooling passage, there is provided a closure element 13 which sits at the end on the hollow-cylindrical element. The closure element 13 is of a substantially annular configuration and has an internal cone provided for receiving a corresponding external cone of a neck jaw.

It can be clearly seen from FIG. 2 that the hollow-cylindrical element 2 of the cavity member 1 together with the base insert 9, 10 forms a mold space 8 in which the molding to be produced is formed.

A sectional view along line A-A in FIG. 2 is shown in FIG. 3, to clearly illustrate the connecting passages 7.

FIG. 4 shows a longitudinal section through the cavity member 1. The cavity member 1 comprises a portion 15 which is intended to be fitted into the cavity plate 14 and a portion 16 which remains outside the cavity plate 14. In this case the collar element 5 rests on the surface of the cavity plate 14.

FIG. 5 diagrammatically shows the fluid flow configuration along the outside of the cavity member 1. Cooling fluid is fed by way of the fluid feed 11 and is divided into two cooling fluid paths disposed in parallel. The cooling fluid now follows the meander arrangement of the cooling passage and flows alternately through axially directed cooling passage portions 3 and peripherally directed cooling passage portions 4, 7. The two cooling fluid paths come together again at the cooling fluid discharge 12.

It can be clearly seen that the proportion of the substantially axially directed cooling passage portions 3 is in total substantially longer than the cooling passage portions 4, 7 which are oriented substantially in the peripheral direction. According to the invention a flow configuration parallel to the axis of the hollow-cylindrical element 4 is advantageous.

FIG. 6 shows a side view and a view from below of a second embodiment of a cavity member according to the invention. Here the cooling passage portions are not provided in the outside wall of the hollow-cylindrical element 2 but are formed by guide elements 17, 17', 17" which connect to the outside wall of the hollow-cylindrical element 2. As shown by way of example in relation to the guide element 17', the guide elements can have a through opening 18 providing a connection with adjacent axially extending cooling passage portions. The guide elements 17, 17" can be bar-shaped of rectangular cross-section or, as shown by way of example with reference to the guide element 17", they can be substantially triangular.

FIG. 7 shows once again the second embodiment of the cavity member 1', the pattern of the cooling fluid flow additionally being shown diagrammatically here. The cooling fluid meets the hollow-cylindrical element 2 at the location marked with the dotted-line circle. The cooling fluid flow is divided by virtue of the guide elements 17 and flows both towards the left and towards the right along the axially extending cooling passage portion. At the end of that axially extending cooling passage portion the cooling fluid flows over through a corresponding through opening into the adjacent axially extending cooling passage portion and there flows again in the axial direction in opposite relationship. That accordingly provides a zig-zag structure or meander structure for the cooling fluid flow.

It can be clearly seen that the hollow-cylindrical element 2 has ring elements 21, 22 projecting at both sides at its end portions. The guide elements 17 are fixed for example by means of weld points 19 only to those ring elements 21, 22 so that no force or stressing is exerted on the hollow-cylindrical element 2 by the guide elements 17. That freedom from forces makes it possible for the wall thickness of the hollow-cylindrical element 2 to be very small without the stability of the cavity member being limited. As a result the cooling fluid can be taken closer to the mold space 8 and cooling can thus be effected more efficiently, and that leads to a reduction in the cycle time, that is to say the time during which the parison must be in the mold space 8.

FIG. 8 shows a sectional view of the second embodiment in the fitted condition. Here the base insert is of a one-part structure and is denoted by reference 23. It will be seen that the guide elements 17 are arranged only at the portion of the hollow-cylindrical element 2, that is outside the collar element 5. The collar element 5 or the ring element 21 is of a configuration as already described in relation to the first embodiment. In other words, the connection between adjacent axially directed cooling passage portions is made by a recess which is formed in the peripheral direction and which is covered over by means of the closure element 13.

FIG. 9 shows a third embodiment of a cavity member according to the invention. Here the guide elements are formed by the deflection element 24 which was pressed into the cavity plate between the base insert 9, 10 on the one hand and the cavity member 1" on the other hand. That deflection element 24 is shown once again separately in FIG. 10 in the installed condition, the direction of the fluid flow being shown here by means of arrows.

FIGS. 11 through 13 show the deflection element 24 once again as a side view and as two sectional views, to clearly illustrate same.

In this case the cooling fluid flow is illustrated by arrows or circular symbols.

In FIG. 12 the symbol comprising a circle in which an 'X' is enclosed is intended to represent a direction of flow into the plane of the drawing while the symbol comprising a circle arranged in a circle is intended to denote a direction of flow out of the plane of the drawing.

FIG. 14 shows a sectional view of this embodiment in the condition of being fitted into the tool. This arrangement however uses a somewhat longer deflection element 24' which is shown once again as side and sectional views in FIGS. 15 through 18.

Finally FIGS. 19 through 21 show a fourth embodiment of the cavity member 1''' according to the invention. The cavity member 1''' again comprises a hollow cylindrical element 2 which is adjoined by a collar element 5. Provided on the outside of the hollow-cylindrical element 2 within the collar element 5 are corresponding bores which extend in the longitudinal or axial direction and which in part form the axially extending cooling passage portions. Respective adjacent axially extending cooling passage portions are connected by means of the recesses 7. At the side of the cavity member, that is remote from the tool or the cavity plate, this embodiment corresponds to the embodiment shown in FIGS. 1 through 3. Unlike the embodiment of FIGS. 1 through 3, no cooling grooves are provided here at the outside of the hollow-cylindrical element 2. In addition no guide elements are welded in place here. Instead, there is provided a cavity enlargement 25 which is fitted in the form of a sleeve on to the outside surface of the hollow-cylindrical element 2. The cavity enlargement 25 has corresponding guide elements 17 at its inside. Those guide elements 17 provide for the meandering cooling fluid flow according to the invention, which occurs substantially in the axial direction. FIG. 21 shows the cavity member 1''' in the condition of being fitted in the tool. This embodiment further has the advantage that the cooling fluid feed 11 and the cooling fluid feed 12 is provided both for the cooling fluid feed for the cavity member 1''' and also for the cooling fluid feed for the base insert 9, 10.

As it is possibly desired for the molding to be produced to be altered, for example for a somewhat different length to be selected, then it is only necessary for the cavity member 1''' including the cavity enlargement 25 to be replaced by suitably modified parts. The cavity plate and the base insert can be retained. In other words the cavity plate can be used for a large number of different tools. Usually the manufacturers of such injection molding machines offer those for a large number of different parison geometries.

If the customer wants an injection molding system for the production of parisons of a different length, with the systems in the state of the art adaptation of the cavity plate is required. The cavity plate can therefore only be manufactured when the exact length of the parison is known. Use of the cavity enlargement according to the invention means that the thickness of the cavity plate is independent of the length of the parison to be produced, so that the cavity plate can already be produced as a standard part before it is in any way known what the parison to be produced looks like. Then, it is only necessary to produce the corresponding cavity enlargements, in dependence on the length of the parison to be produced.

FIG. 22 shows a further embodiment of a cavity member. Here the guide element is formed by a spiral element 27 pushed on to the hollow-cylindrical element 2. The spiral element here comprises a sleeve into which a continuous spiral recess is introduced. It will be readily seen that the spiral element entails a certain flexibility. When fitting the spiral element 27 on to the hollow-cylindrical element 2 an end of the spiral element can be rotated in the peripheral direction and/or pushed in the axial direction on the hollow-cylindrical element 2, as indicated by the arrows in FIG. 22. It will be clear that the diameter of the spiral element either increases or decreases by rotation of the two ends of the spiral element in the peripheral direction. For the assembly operation therefore the ends of the spiral element are firstly rotated in the peripheral direction relative to each other to enlarge the diameter. The spiral element 27 can then be pushed on to the hollow-cylindrical element. When the spiral element 27 is released the spiral element will bear of its own accord against the surface of the hollow-cylindrical element. Therefore the spiral element according to the invention affords a kind of self-clamping action so that generally there is no need for additional fixing.

Furthermore FIGS. 23 and 24 show a sixth embodiment of a cavity member. Here the guide element is formed by a sleeve 28 in which a spiral groove 29 is provided. FIG. 23 shows a view in longitudinal section and FIG. 24 shows a view in cross-section.

FIG. 25 shows a sectional view of a fifth embodiment. This embodiment substantially corresponds to the embodiment of FIG. 8, wherein here the connecting passages are not afforded by a recess disposed in the peripheral direction, which is covered by a closure element, but by two blind bores which are inclined with respect to the axial direction, wherein two blind bores meet and thus embody a V-shaped connecting passage.

That therefore affords the flow configuration shown at the left in the Figure, for the flow of cooling fluid.

Efficient cooling of the cavity member is achieved by the measure according to the invention.

Figure 29:
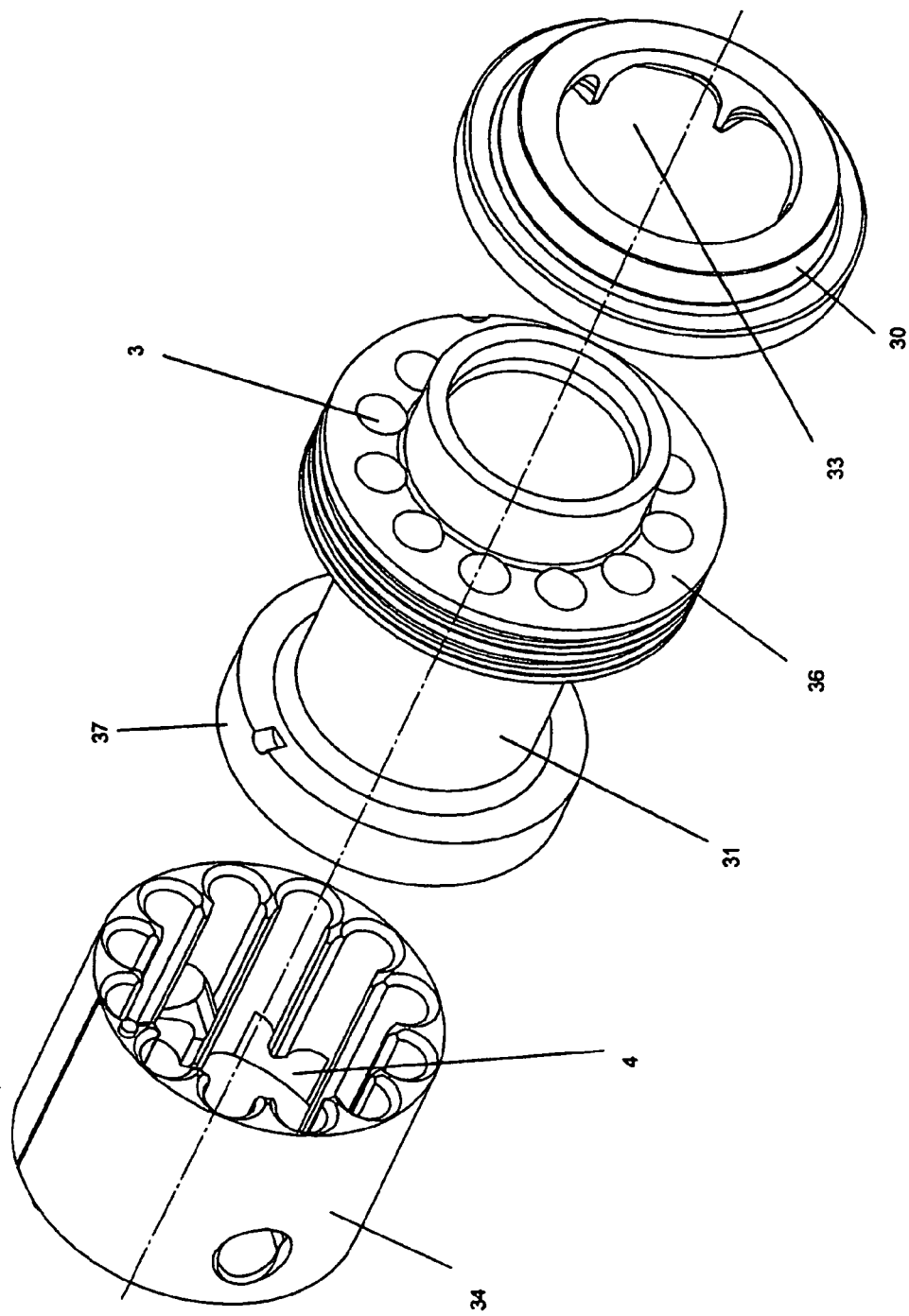
FIG. 29 shows an exploded view of the embodiment of FIG. 26.

FIGS. 26 through 30 show a sixth embodiment of the invention. FIG. 26 shows a perspective view and FIG. 29 shows an exploded view. The cavity is of a three-part construction and comprises a cover element 30, a main part 31 and a peripheral casing or sleeve portion 34. The main part 31 substantially comprises a hollow cylinder which has a respective collar portion 36, 37 in its two end regions. Provided in the front collar portion are a row of axially extending bores which serve as axially extending cooling passage portions 3. Those bores are open at both ends.

The cover element 30 has milled-out portions 33 extending in the peripheral direction. They are so arranged that they prolong and partially interconnect the axially extending cooling passages which open at the end of the front collar portion 36. Two adjacent cooling passages are always connected together in paired relationship so that coolant flowing through an axially extending cooling passage in the direction of the cover element 30 is deflected by the milled-out portions into the adjacent cooling passage and there flows in the opposite direction.

The main part of the axially extending cooling passage portions however is formed by the casing portion 34. The casing portion has axially extending recesses (grooves) provided at one side therein. When the casing portion 34 is placed around the cylindrical outside surface of the main part 31 the recesses in the casing portion 34 form axially extending cooling passages. At the side remote from the cover element 30 the axially extending cooling passages are connected together in paired relationship by a peripherally extending connecting passage forming the peripherally extending cooling passage portion 4. The connecting passage 4 is formed by adjacent grooves in the casing portion being connected together, that is to say the land formed between the grooves is shortened.

There are further provided a cooling fluid feed 11 and discharge 12. When the cavity member is supplied with cooling fluid by way of the cooling fluid feed 11 the result is the configuration diagrammatically shown in FIG. 5. Here too the entire cooling passage is of a meander-shaped configuration, wherein, to increase the through-flow of cooling agent, cooling agent always flows through two adjacent axially extending passages in parallel relationship (and in opposite relationship to the nearest two adjacent axially extending cooling passages).

Figure 30:
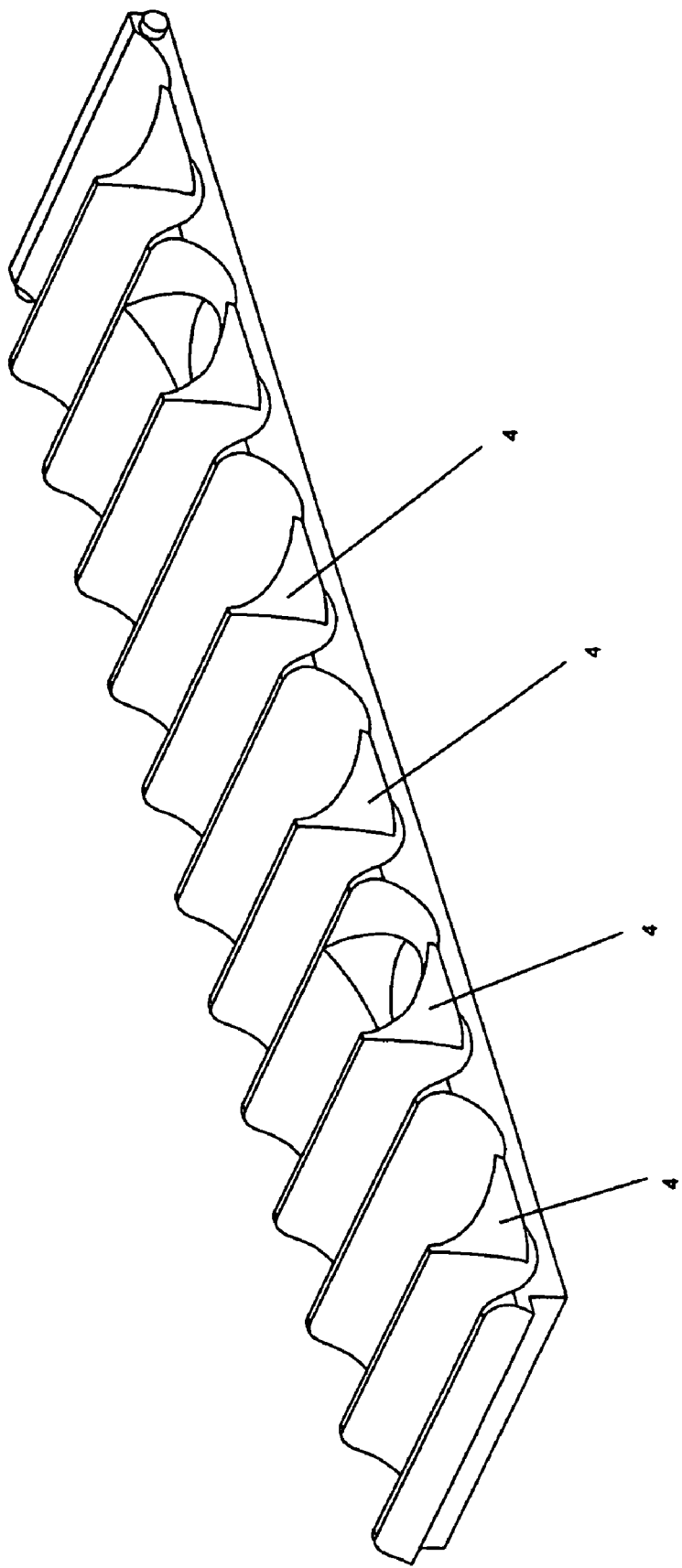
FIG. 30 shows a perspective view of the peripheral casing element of the seventh embodiment in the flat condition.

FIG. 30 shows the casing portion in the unrolled, that is to say flat condition, so that production of the connecting portions 4 can be clearly seen.

Figure 31:
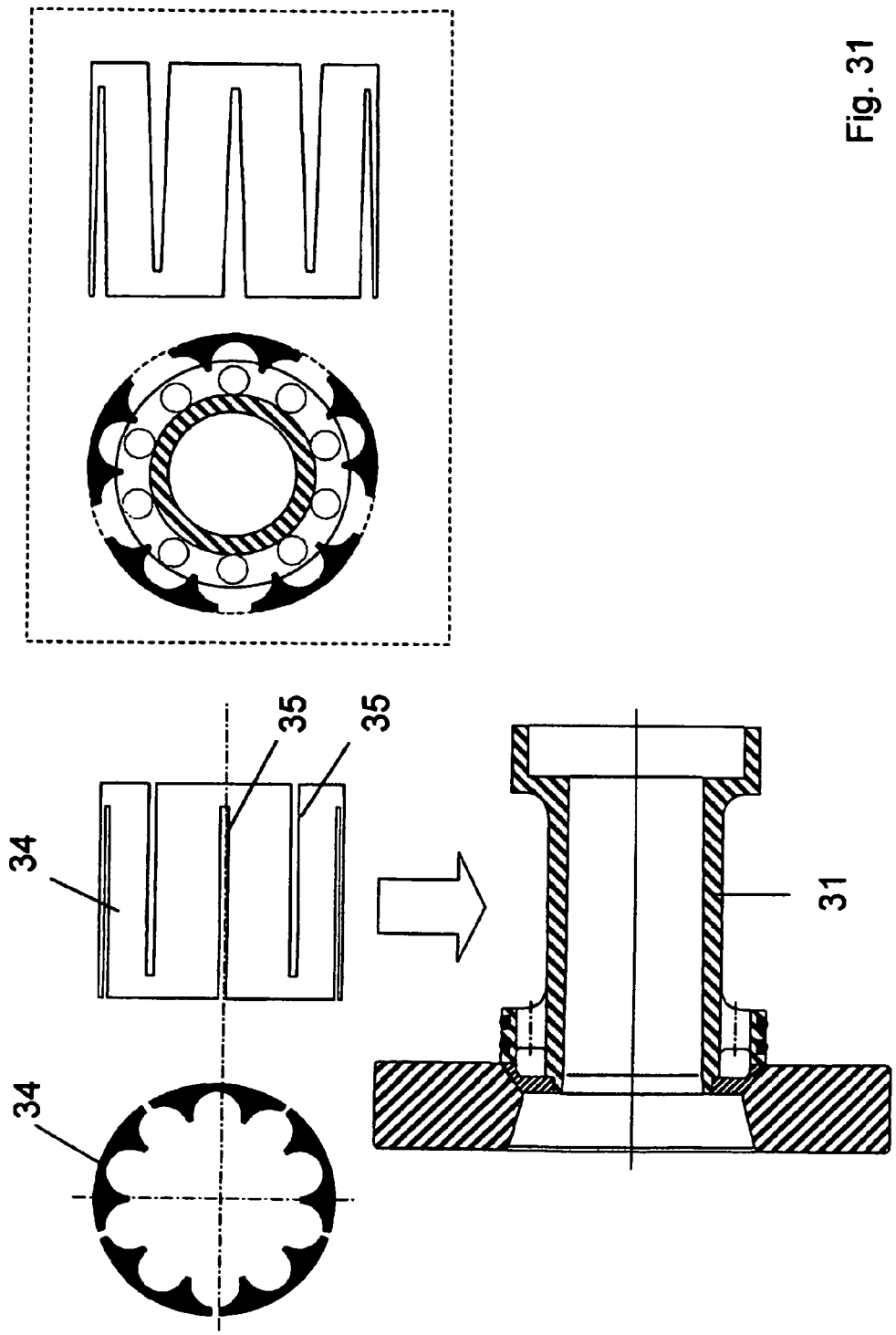
FIG. 31 shows diagrammatic sketches of an eighth embodiment.

FIG. 31 shows an eighth embodiment of the invention. Here the casing portion 30 comprises a flexible material such as for example POM. A cross-sectional view is shown at top left in FIG. 31. It will be seen that the casing portion 34 has on both sides incisions 35 which alternately engage into each other so that basically the casing portion 34 is of a meander-shaped configuration. The result of this, as shown at top right in FIG. 31, is that the casing portion can be pulled apart somewhat by virtue of its elasticity so that it can be pulled on to the main part 31. The casing portion 34 is drawn on to the cylindrical outside surface of the main part 31, by virtue of the elastic characteristics of the casing portion.

The casing portion 34 can thus be easily produced in one piece and can be fitted without a tool.

LIST OF REFERENCES 1 cavity
2 hollow-cylindrical portion
3 cooling passage portions extending in the axial direction
4 cooling passage portions extending in the peripheral direction
5 collar element
6 recess in the collar element
7 recesses
8 mold space
9, 10 base insert
11 fluid feed
12 cooling fluid discharge
13 closure element
14 cavity plate
15 portion within the cavity plate
16 portion outside the cavity plate
17,17',17" guide elements
18 through opening
19 weld points
20 fluid flow pattern
21, 22 ring elements
23 base insert
24 deflection element
25 cavity enlargement
26 comb element
27 spiral element
28 sleeve
29 grooves
30 cover element
31 main part
32 connecting grooves
33 milled-out portions
34 peripheral casing portion
35 incisions
36 front collar portion
37 rear collar portion

What is claimed is:

1. A cavity member for a mold cavity structure for the production of hollow body moldings, wherein the cavity member (1) has a substantially hollow-cylindrical element (2) having an outside and ends, wherein a cooling passage is provided at the outside of the hollow-cylindrical element (2), wherein a plurality of guide elements for forming the cooling passage are provided, wherein the hollow-cylindrical element (2) has at its outside and substantially at its ends a respective ring element (21, 22) projecting beyond the outside of the hollow-cylindrical element (2), wherein the guide elements (17) are fixed to the ring elements (21, 22).

2. A cavity member as set forth in claim 1 wherein the guide elements (17) are substantially bar-shaped, wherein the guide elements (17) are oriented in an axial direction.

3. A cavity member as set forth in claim 2 wherein at least some of the guide elements (17) have a through opening (18) forming the cooling passage portions (4) arranged substantially in a peripheral direction in the region of an end portion of the guide element (17).

4. A cavity member as set forth in claim 1 wherein the guide elements (17) are of a substantially triangular cross-sectional area.

5. A cavity member as set forth in claim 1 wherein the guide elements (17) are rounded at a side remote from the hollow-cylindrical element (2).

6. A cavity member as set forth in claim 1 wherein the cooling passage has a plurality of cooling passage portions (3) extending substantially in the axial direction and at least one cooling passage connecting portion (4), wherein the cooling passage connecting portion (4) connects two cooling passage portions (3) extending substantially in the axial direction.

7. A cavity member as set forth in claim 6 wherein there are at least eight cooling passage portions (3) extending substantially in the axial direction.

8. A cavity member as set forth in claim 6 wherein the cooling passage connecting portion is arranged substantially in a peripheral direction that follows the curve of the periphery of the outside of the hollow-cylindrical element (2).

9. A cavity member as set forth in claim 1 wherein the cavity member (1) has a collar portion (5) with a through opening, wherein the hollow-cylindrical element (2) is in part arranged in the through opening so that the through opening is filled in part by the hollow-cylindrical element (2).

10. A cavity member as set forth in claim 8 wherein at least some of the cooling passage portions (4) extending substantially in the peripheral direction are arranged at an end of the hollow-cylindrical element (2), wherein there is provided a closure element (13) which at the end closes the cooling passage portions (4) which are arranged at the end of the hollow-cylindrical element (2) and which extend substantially in the peripheral direction.

11. A cavity member as set forth in claim 10 wherein the closure element (13) is soldered to the hollow-cylindrical element (2).

12. A cavity member as set forth in claim 10 wherein the closure element (13) is of a substantially annular configuration and has an internal cone at the side remote from the cooling passage portions (3, 4).

13. A cavity member as set forth in claim 1 wherein two comb elements with teeth are provided as the guide elements, the comb elements being so arranged that the teeth of the two comb elements respectively engage into inter-tooth spaces of the other comb element.

14. A cavity member as set forth in claim 13 wherein the comb elements respectively comprise a ring element and at least one and a plurality of tooth elements extending from the ring element in the direction of an axis of the ring.

15. A cavity member as set forth in claim 1 wherein a spiral element is provided as the guide element, the spiral element being pushed on to the outside of the hollow-cylindrical element.

16. A cavity member as set forth in claim 1 wherein the cooling passage is of a substantially rectangular cross-section.

17. A cavity member as set forth in claim 1 wherein the cooling passage has an inwardly curved passage base.

18. A cavity member as set forth in claim 1 wherein the cooling passage is open at its side remote from the hollow-cylindrical part.

19. A mold cavity structure for the production of hollow body moldings comprising a cavity member (1) as set forth in claim 1.

20. A tool for the production of hollow body moldings by means of injection molding comprising a mold cavity structure as set forth in claim 19 there is provided a cavity plate (14) having at least one recess in which the cavity member (1) is arranged.

21. A tool as set forth in claim 20 wherein the cavity plate (14) has a cooling fluid feed (11) and a cooling fluid discharge (12), wherein the cooling fluid feed and discharge as well as the cooling passage of the cavity member (1) are so arranged that two parallel cooling circuits are formed between the cooling fluid feed and discharge.

22. A tool as set forth in claim 20 wherein a cooling fluid distributor is arranged in the recess in the cavity plate, which distributor connects together at least two substantially axially extending cooling passage portions (3) of the hollow-cylindrical element (2) by way of a connecting passage arranged within the cooling fluid distributor so that the connecting passage forms a cooling passage portion (4) arranged substantially in the peripheral direction.

23. A tool as set forth in claim 20 wherein a cavity enlargement is provided which partially embraces the hollow-cylindrical element and the cooling passages arranged thereon.

24. A tool as set forth in claim 23 wherein the cavity enlargement is of a sleeve-shaped configuration and preferably has separating elements at its inside surface so that a cooling passage is formed by the inside wall of the cavity enlargement, the separating elements thereof and the outside surface of the hollow-cylindrical element.

25. A tool as set forth in claim 23 wherein the cavity enlargement is an element which is separate from the cavity plate and the cavity member, wherein preferably sealing elements are provided between the cavity enlargement and the cavity plate and between the cavity enlargement and the cavity member.

* * * * *